United States Patent
Ferdi et al.

(10) Patent No.: US 12,212,957 B2
(45) Date of Patent: Jan. 28, 2025

(54) METHODS AND APPARATUS FOR WTRU-TO-WTRU RELAY DISCOVERY SECURITY AND PRIVACY

(71) Applicant: INTERDIGITAL PATENT HOLDINGS, INC., Wilmington, DE (US)

(72) Inventors: Samir Ferdi, Kirkland (CA); Michelle Perras, Montréal (CA); Taimoor Abbas, Sainte-Julie (CA); Jung Je Son, Warrington (PA); Magurawalage Chathura Madhusanka Sarathchandra, London (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/770,937

(22) Filed: Jul. 12, 2024

(65) Prior Publication Data
US 2024/0365113 A1   Oct. 31, 2024

Related U.S. Application Data

(63) Continuation of application No. PCT/US2024/018666, filed on Mar. 6, 2024.
(Continued)

(51) Int. Cl.
*H04W 12/033* (2021.01)
*H04W 8/00* (2009.01)
*H04W 12/0433* (2021.01)

(52) U.S. Cl.
CPC ......... *H04W 12/033* (2021.01); *H04W 8/005* (2013.01); *H04W 12/0433* (2021.01)

(58) Field of Classification Search
None
See application file for complete search history.

(56) References Cited

U.S. PATENT DOCUMENTS

| 10,511,954 B2 * | 12/2019 | Sen | H04W 76/14 |
| 2015/0339718 A1 * | 11/2015 | Walton | G06Q 30/0261 |
| | | | 705/14.58 |

(Continued)

FOREIGN PATENT DOCUMENTS

| CN | 115529588 | 12/2022 | |
| WO | WO-2022038292 A1 * | 2/2022 | ............ H04W 12/02 |

(Continued)

OTHER PUBLICATIONS

Interdigital, "Discussion on ProSe U2U Relay discovery security with Model A," 3GPP TSG-SA3 Meeting #111, S3-232594, Berlin, Germany (May 22-26, 2023).

(Continued)

*Primary Examiner* — Kaveh Abrishamkar
(74) *Attorney, Agent, or Firm* — Volpe Koenig

(57) ABSTRACT

A method for UE-to-UE (U2U) relay discovery security is disclosed. The method may comprise provisioning an end-UE with security material for a direct discovery set and a U2U discovery message and provisioning a U2U relay with security material for the U2U discovery message. The security material for the direct discovery set may comprise at least one of: A ProSe restricted code, associated key material, or an indicator associated with a relay service code (RSC) that indicates whether the RSC supports per ProSe direct discovery set protection. The method may comprise sending, by the end-UE to the U2U relay, a direct connection request (DCR) message. The DCR message may comprise at least one of: an RSC, and end-UE User info identification (ID), or a ProSe restricted code. The method may comprise (Continued)

sending, by the end-UE, an indication for direct discovery set protection.

16 Claims, 14 Drawing Sheets

Related U.S. Application Data

(60) Provisional application No. 63/489,273, filed on Mar. 9, 2023.

(56) References Cited

U.S. PATENT DOCUMENTS

| | | | | |
|---|---|---|---|---|
| 2016/0285539 | A1* | 9/2016 | Sadiq | H04W 8/005 |
| 2018/0084499 | A1* | 3/2018 | Qi | H04W 52/0235 |
| 2019/0230723 | A1* | 7/2019 | Kim | H04W 76/12 |
| 2020/0059767 | A1* | 2/2020 | Woo | H04W 4/027 |
| 2022/0109996 | A1 | 4/2022 | Lee et al. | |
| 2022/0360966 | A1 | 11/2022 | Kim et al. | |
| 2022/0377524 | A1* | 11/2022 | Ferdi | H04W 8/005 |
| 2023/0007455 | A1* | 1/2023 | Kuo | H04W 76/11 |

FOREIGN PATENT DOCUMENTS

| | | | |
|---|---|---|---|
| WO | 2022/175538 | 8/2022 | |
| WO | WO-2022175538 A1 * | 8/2022 | H04L 63/0807 |

OTHER PUBLICATIONS

Interdigital, "Draft LS on Security for U2U Relay Discovery with Model A," 3GPP TSG-SA3 Meeting #111, S3-232595, Berlin, Germany (May 22-26, 2023).

Interdigital, "New solution Model A Relay discovery using multiple key sets," 3GPP TSG-SA3 Meeting #110Ad-Hoc-e, S3-231785, Electronic meeting, Online (Apr. 17-21, 2023).

Interdigital, "Security related updates to procedure for 5G ProSe UE-to-UE relay discovery—Model A," 3GPP TSG-CT WG1 Meeting #145, C1-238820, Chicago, USA (Nov. 13-17, 2023).

Interdigital, "Update to TR 33.740 Conclusion for KI#1," 3GPP TSG-SA3 Meeting #111, S3-232593, Berlin, Germany (May 22-26, 2023).

Interdigital, "Update to TR 33.740 Solution #36," 3GPP TSG-SA3 Meeting #111, S3-232600, Berlin, Germany (May 22-26, 2023).

Qualcomm Incorporated et al., "Updating security procedure for U2U relay discovery with model A in ProSe draft CR," 3GPP TSG-SA3 Meeting #112, S3-234339, Gothenburg, Sweden (Aug. 14-18, 2023).

Third Generation Partnership Project, "Technical Specification Group Services and System Aspects; Proximity based Services (ProSe) in the 5G System (5GS) (Release 18)," 3GPP TS 23.304 V18.0.0 (Dec. 2022).

Third Generation Partnership Project, "Technical Specification Group Services and System Aspects; Proximity based Services (ProSe) in the 5G System (5GS) (Release 18)," 3GPP TS 23.304 V18.4.0 (Dec. 2023).

Third Generation Partnership Project, "Technical Specification Group Core Network and Terminals; Proximity-services (ProSe) in 5G System (5GS) protocol aspects; Stage 3 (Release 17)," 3GPP TS 24.554 V17.3.0 (Dec. 2022).

Third Generation Partnership Project, "Technical Specification Group Core Network and Terminals; Proximity-services (ProSe) in 5G System (5GS) protocol aspects; Stage 3 (Release 17)," 3GPP TS 24.554 V17.7.0 (Dec. 2023).

Third Generation Partnership Project, "Technical Specification Group Core Network and Terminals; Proximity-services (ProSe) in 5G System (5GS) protocol aspects; Stage 3 (Release 18)," 3GPP TS 24.554 V18.3.0 (Dec. 2023).

Third Generation Partnership Project, "Technical Specification Group Services and System Aspects; Security Aspects of Proximity based Services (ProSe) in the 5G System (5GS) (Release 17)," 3GPP TS 33.503 V17.3.0 (Mar. 2023).

Third Generation Partnership Project, "Technical Specification Group Services and System Aspects; Security Aspects of Proximity based Services (ProSe) in the 5G System (5GS) (Release 17)," 3GPP TS 33.503 V17.6.0 (Dec. 2023).

Third Generation Partnership Project, "Technical Specification Group Services and System Aspects; Security Aspects of Proximity based Services (ProSe) in the 5G System (5GS) (Release 18)," 3GPP TS 33.503 V18.1.0 (Dec. 2023).

Third Generation Partnership Project, "Technical Specification Group Services and System Aspects; Study on security aspects of Proximity Based Services (ProSe) in 5G System (5GS) phase 2 (Release 18)," 3GPP TR 33.740 V18.1.0 (Sep. 2023).

Third Generation Partnership Project, "Technical Specification Group Services and System Aspects; Study on security aspects of Proximity Based Services (ProSe) in 5G System (5GS) phase 2 (Release 18)," 3GPP TR 33.740 V0.6.0 (Feb. 2023).

Third Generation Partnership Project, "Technical Specification Group Services and System Aspects; Study on security aspects of Proximity Based Services (ProSe) in 5G System (5GS) phase 2 (Release 18)," 3GPP TR 33.740 V0.5.0 (Jan. 2023).

Third Generation Partnership Project, "Technical Specification Group Services and System Aspects; Proximity-based Services (ProSe); Security aspects (Release 17)," 3GPP TS 33.303 V17.1.0 (Sep. 2022).

Third Generation Partnership Project, "Technical Specification Group Services and System Aspects; Proximity-based Services (ProSe); Security aspects (Release 17)," 3GPP TS 33.303 V17.2.0 (Jun. 2023).

* cited by examiner

METHODS AND APPARATUS FOR WTRU-TO-WTRU RELAY DISCOVERY SECURITY AND PRIVACY

CROSS-REFERENCE TO RELATED APPLICATIONS

This application is a continuation of International Application No. PCT/US2024/018666, filed Mar. 6, 2024, which claims the benefit of U.S. Provisional Application No. 63/489,273, filed Mar. 9, 2023, the contents of which are incorporated herein by reference.

BACKGROUND

Proximity based Services (ProSe) may be provided to UEs that are in close proximity of each other. A UE may support ProSe direct discovery procedures, which may be used to discover other UEs in proximity. A UE may also support direct communication with another UE, e.g., direct transmission of data to another UE without traversing the infrastructure network.

The discovery procedure may also be considered open or restricted. In the case of open discovery, no explicit permission would be needed from the UE being discovered. In the case of restricted discovery, there may be a requirement for an explicit permission given to the discoverer UE authorizing the discoverer UE to discover a discoveree UE. This permission may be associated with, for example, a ProSe restricted code. The ProSe restricted code may be provisioned or configured in UEs authorized to use or provide or discover other UEs that are using the same ProSe restricted code.

SUMMARY

Proximity based Services (ProSe) services may be provided to UEs that are in close proximity of each other. A UE may support ProSe direct discovery procedures, which may be used to discover other UEs that are in proximity. A UE may also support direct communication with another UE. A UE-to-UE relay may be capable of relaying traffic to and from End-UEs. A UE-to-UE relay broadcasts discovery messages including its associated relay service code (RSC) to facilitate the relay discovery process for end-UEs. The discovery message may include a direct discovery set (DDS). The DDS may contain information associated with one or more end-UEs that are in proximity of the UE-to-UE relay. This may include the user information identification (user info ID) and a ProSe restricted code. Each RSC may have one or more ProSe restricted codes associated to it. An end-UE IP address/prefix information is associated with a unique pair of ProSe restricted code and user info ID.

Potential security requirements for UE-to-UE relay UE-to-UE relay may include protection of discovery messages and of privacy sensitive information of UEs during a UE-to-UE relay discovery procedure. Security keys may be used to protect messages during transmission. Both the relay and end-UE may be provisioned with the security material associated with the RSC to properly exchange and process the security of the relay message. Only the authorized end-UEs may be provisioned with the security material associated with a given Prose restricted code. The UE-to-UE relay may only share the IP address/prefix information of a first end-UE with a second end-UE if the second end-UE is authorized for restricted discovery with the same ProSe restricted code associated with the first end-UE.

The end-UE sends a protected DDS to the UE-to-UE relay and the UE-to-UE relay includes the protected DDS in the discovery message. In one example, the end-UE may run a timer to trigger the sending of an updated protected DDS to the UE-to-UE relay when the timer expires. In another example, the UE-to-UE relay may provide information on a next announcement opportunity and the end-UE may then send an updated protected DDS to the UE-to-UE relay during the next announcement opportunity.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
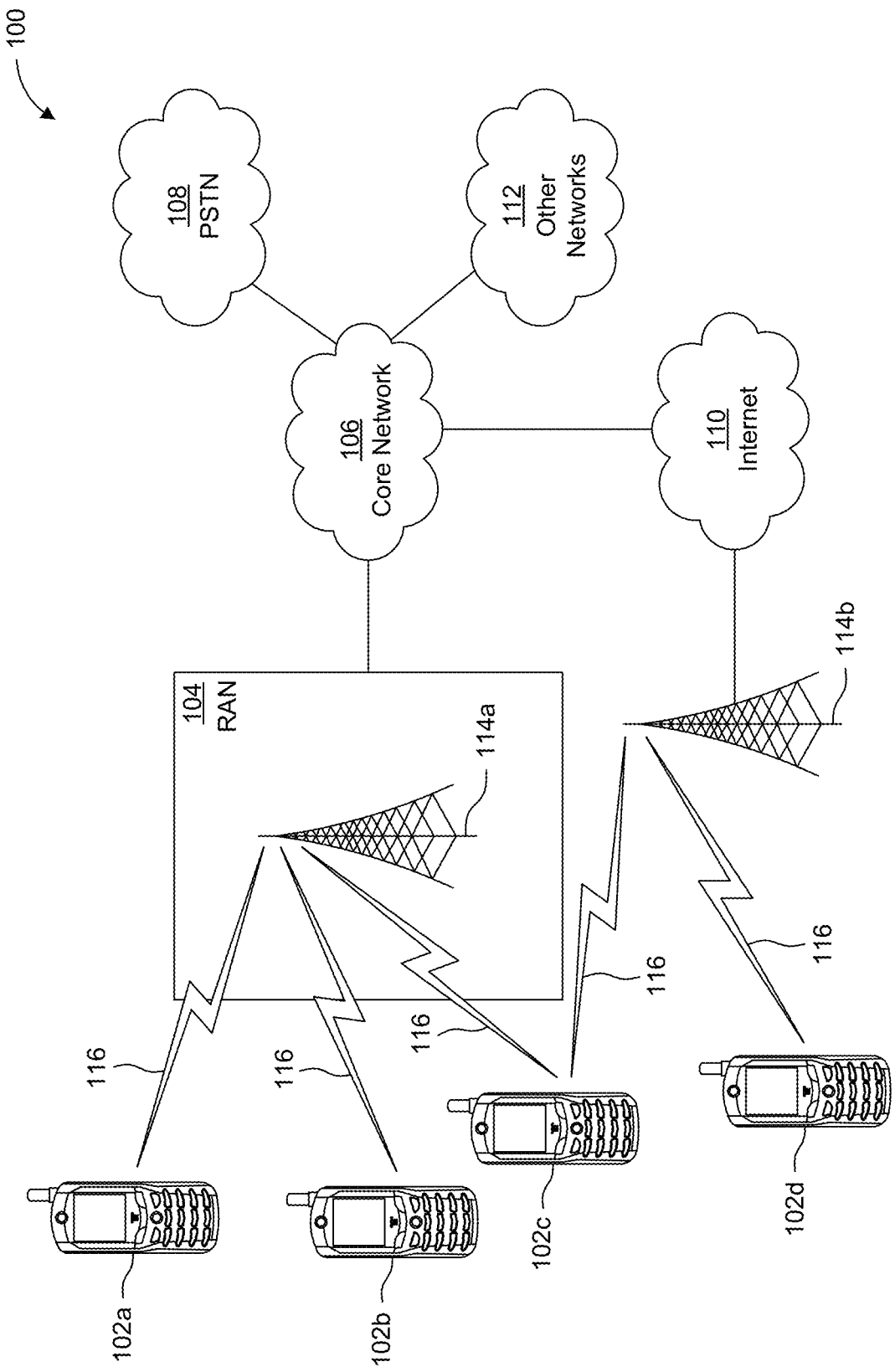
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
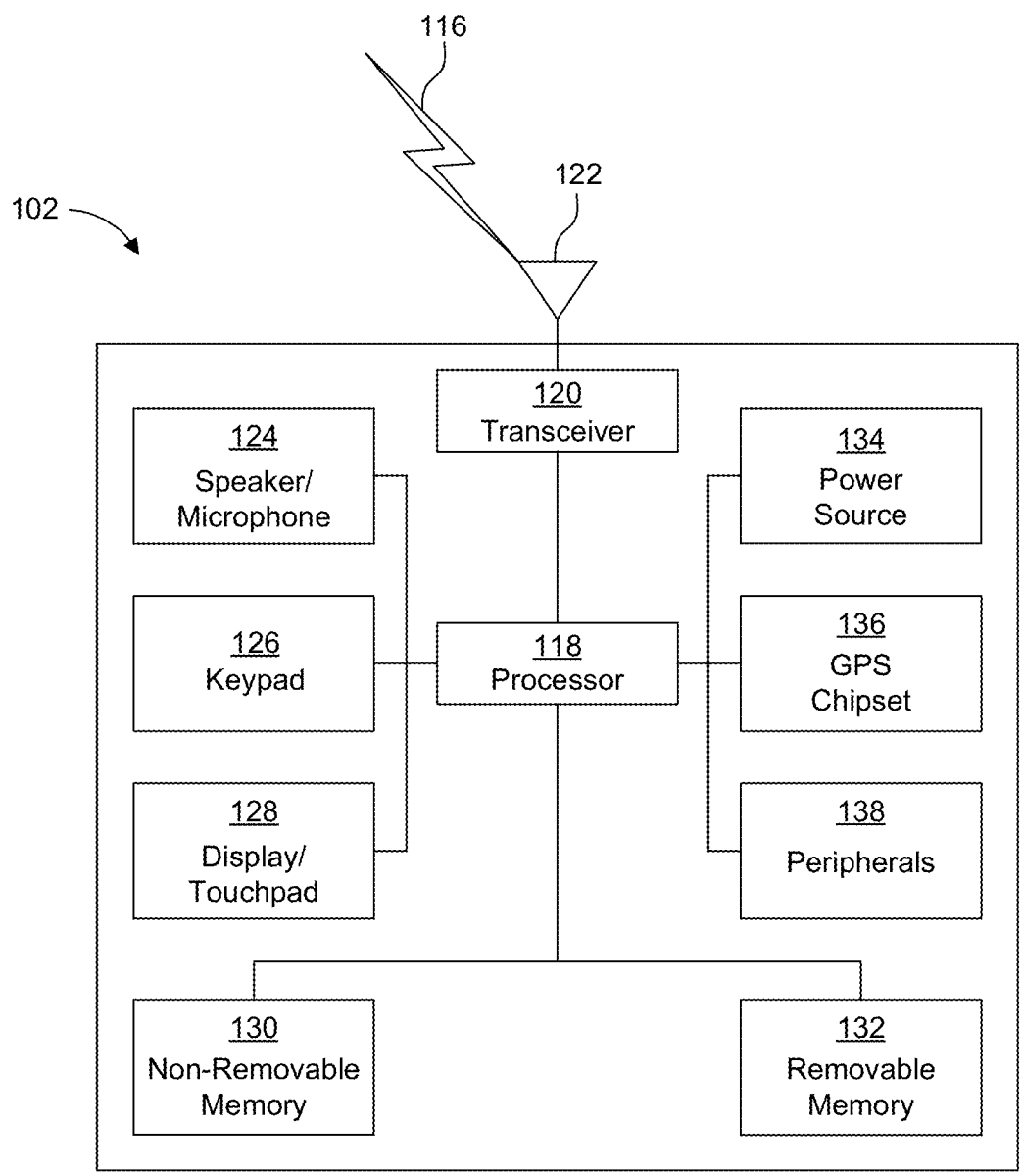
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
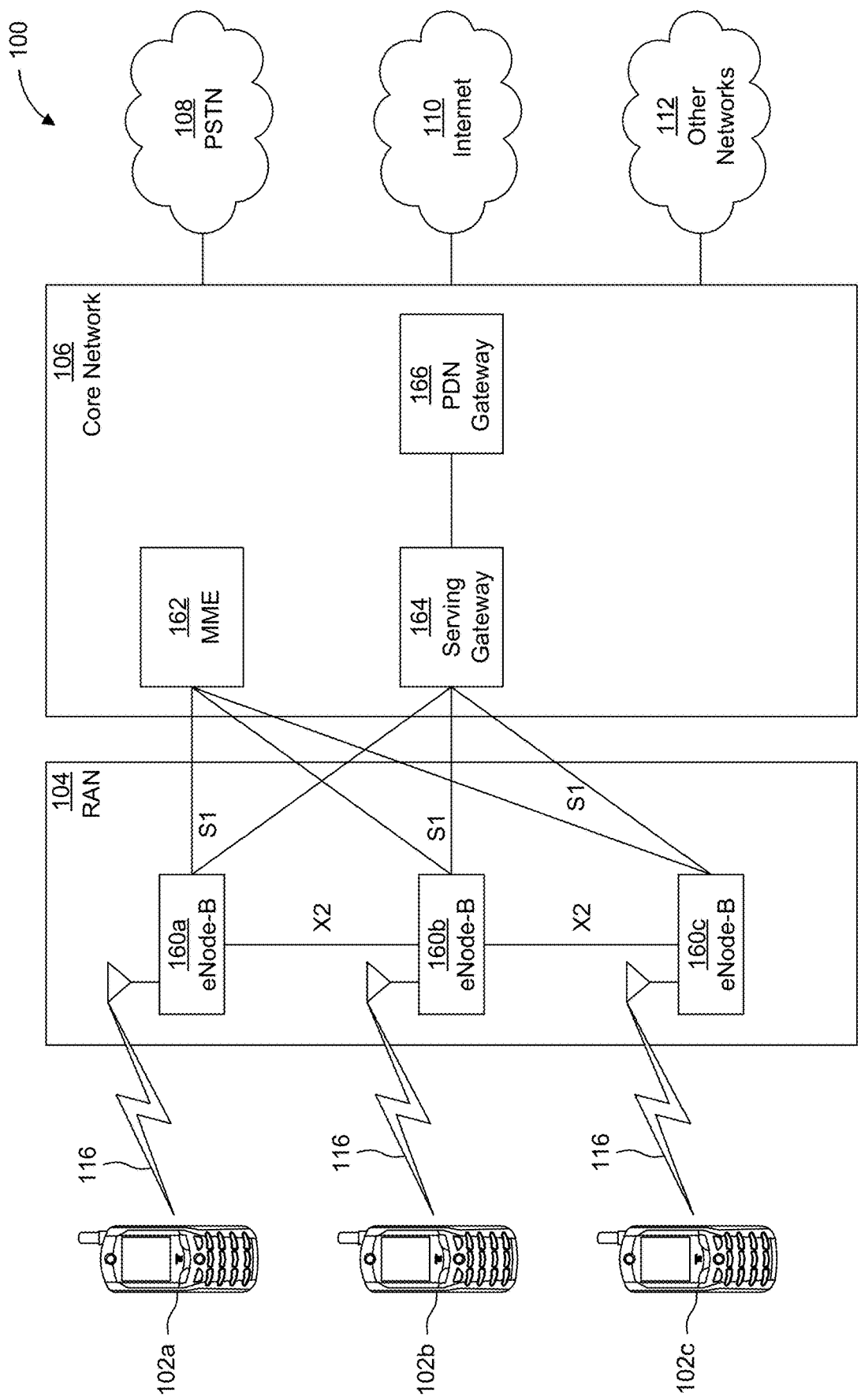
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
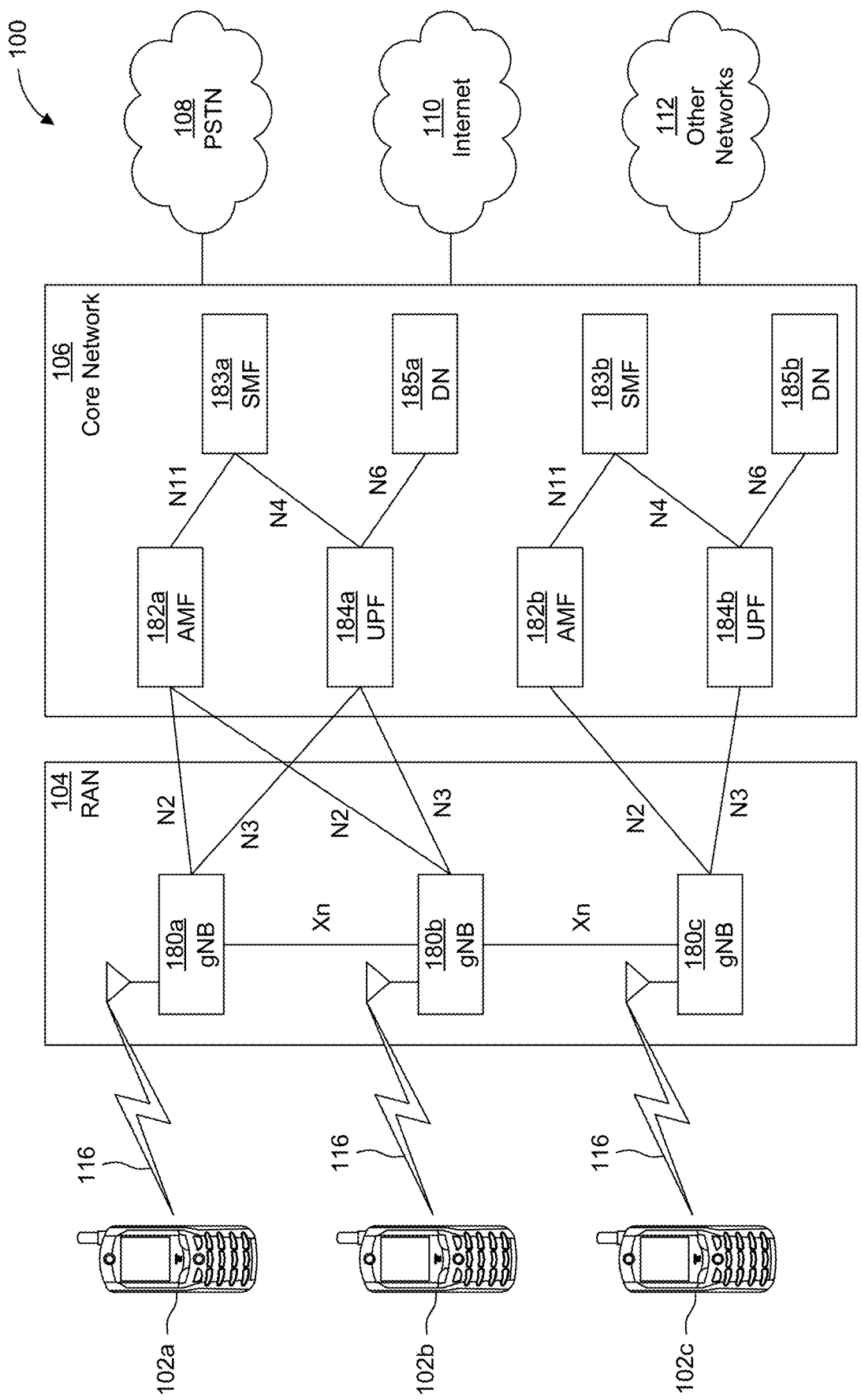
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following abbreviations and acronyms may be referred to:

5GS 5G System
DCA Direct Connection Accept
DCR Direct Connection Request
DDS Direct Discovery Set
DNMF Direct Discovery Name Management Function
LMA Link Modification Accept
LMR Link Modification Request
MIC Message Integrity Code
PCF Policy Control Function
PKMF ProSe Key Management Function
ProSe Proximity based Services
RSC Relay Service Code
U2U UE-to-UE
UTC Universal Time Coordinated Proximity based Services (ProSe) services may be provided to UEs that are in close proximity of each other. A UE may support ProSe direct discovery procedures, which may be used to discover other UEs in its vicinity. A UE may also support direct communication with another UE, e.g., direct transmission of data to another UE without traversing the infrastructure network.

For ProSe direct discovery, two models may be considered, depending on the roles the UEs performs. In Model A, UEs may be classified as announcing or monitoring UEs, based on their roles: An announcing UE may announce/broadcast information that may be used by monitoring UEs to discover the announcing UE. In Model B, UEs may be classified as discoverer or discoveree UEs, based on their roles: A discoverer UE may transmit a request containing information about what it is interested in discovering and a discoveree UE that receives the request may respond with some information related to the discoverer UE's request. The discoveree UE may be referred to as the announcing UE. The discoverer UE may be referred to as the monitoring UE.

The discovery procedure may also be considered open or restricted. In the case of open discovery, no explicit permission would be needed from the UE being discovered. In the case of restricted discovery, there may be a requirement for an explicit permission given to the discoverer UE authorizing the discoverer UE to discover a discoveree UE. This permission may be associated with, for example, a ProSe restricted code. The ProSe restricted code may be provisioned or configured in UEs authorized to use or provide or discover other UEs that are using the same ProSe restricted code. A ProSe restricted code may be, for example, associated with a ProSe service or with a ProSe application identity (e.g., ProSe app ID). The ProSe restricted code may be sent by the announcing UE over the air to advertize its authorization for discovery purposes, facilitating the discovery process.

Figure 2:
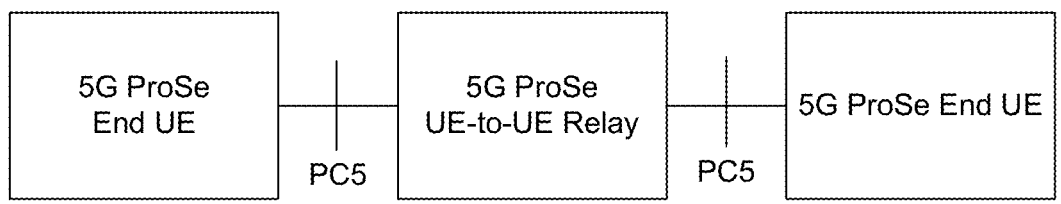
FIG. 2 illustrates an example of the connectivity of end-UEs using a UE-to-UE relay connectivity over the PC5 interface.

A UE-to-UE (U2U) relay is a UE which is capable of relaying traffic to and from end-UEs. FIG. 2 illustrates an example of the connectivity of end-UEs using a UE-to-UE relay connectivity over the PC5 interface.

Figure 3:
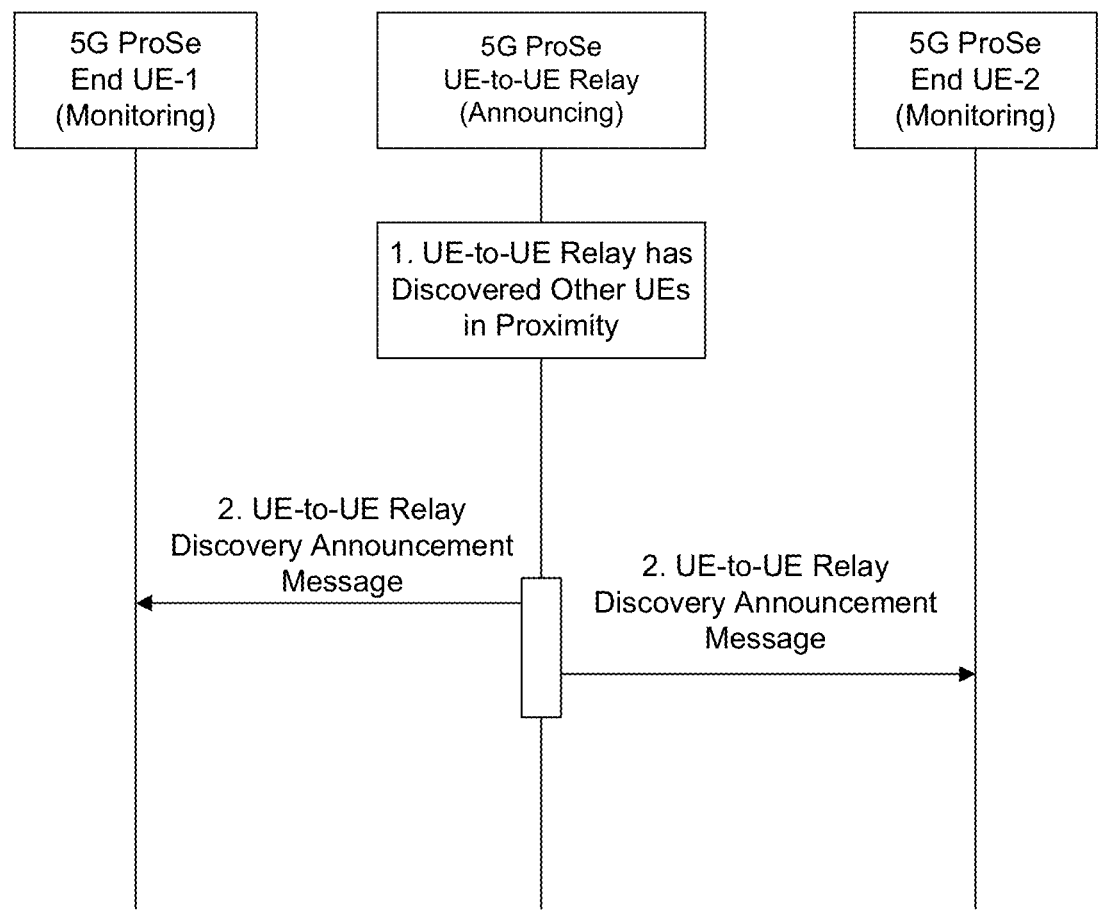
FIG. 3 illustrates the UE-to-UE relay discovery procedure with Model A.

FIG. 3 illustrates the U2U relay discovery procedure with Model A. In (1), the U2U relay has discovered other UEs in proximity. In (2), the U2U relay broadcasts a discovery announcement message. A relay service code (RSC) may be used to identify the connectivity service the U2U relay provides. An RSC may be pre-configured or provisioned in the U2U relay and in the authorized end-UEs. An RSC may have associated security policies or information e.g. necessary for authentication and authorization between the end-UE and the U2U relay. A U2U relay may broadcast discovery/announcement messages where it advertises its relay service capability by including an associated RSC in the message.

There may be cases where an end-UE may be interested in discovering another end-UE which is authorized to use or provide a specific ProSe service, but the end-UEs are not in proximity of each other. If the end-UEs are in proximity of a U2U relay, the U2U relay may be able to facilitate the discovery process. The U2U relay may, for example, advertise information associated with the end-UEs in proximity. The U2U relay discovery message may, for example, include information associated with end-UEs in proximity and the services they are authorized to use/provide, such as the ProSe restricted codes they are announcing. At the same time, the U2U relay may also include its own information, such as the RSC, to support U2U relay discovery. Information to support the U2U relay discovery may include e.g., the U2U relay info ID and relay service code (RSC). Information associated to end-UEs is referred to as direct discovery set (DDS).

The DDS may contain information associated with end-UEs that are in the vicinity of the U2U relay and that the U2U relay can communicate with. The DDS may include the user information identification (User info ID) and a ProSe restricted code associated with the end-UE. The User info ID may be assigned to the end-UEs on a per-service basis. It may be unique for each end-UE using the service and it may be used to differentiate end-UEs using the same service.

Potential security requirements for U2U relays may include protection of discovery messages and privacy of sensitive information of end-UEs during a UE-to-UE relay discovery procedure. Security keys may be used to protect messages during transmission. Both the UE-to-UE relay and end-UEs may be provisioned with the security material associated with the RSC to properly exchange and process the relay messages. However, only the authorized end-UEs may be provisioned with the security material associated with a given Prose restricted code.

The terms security material, security key, and security key set are used interchangeably herein to represent one or more parameters used to protect or secure a message or parts of a message. The terms protected message and secured message are used interchangeably herein to represent a message which is protected/secured with specific security material. Security material for different messages may be different, and accordingly, they are represented herein by using an association of security material with some or all of the information they are protecting, e.g., RSC-associated security material.

Figure 4:
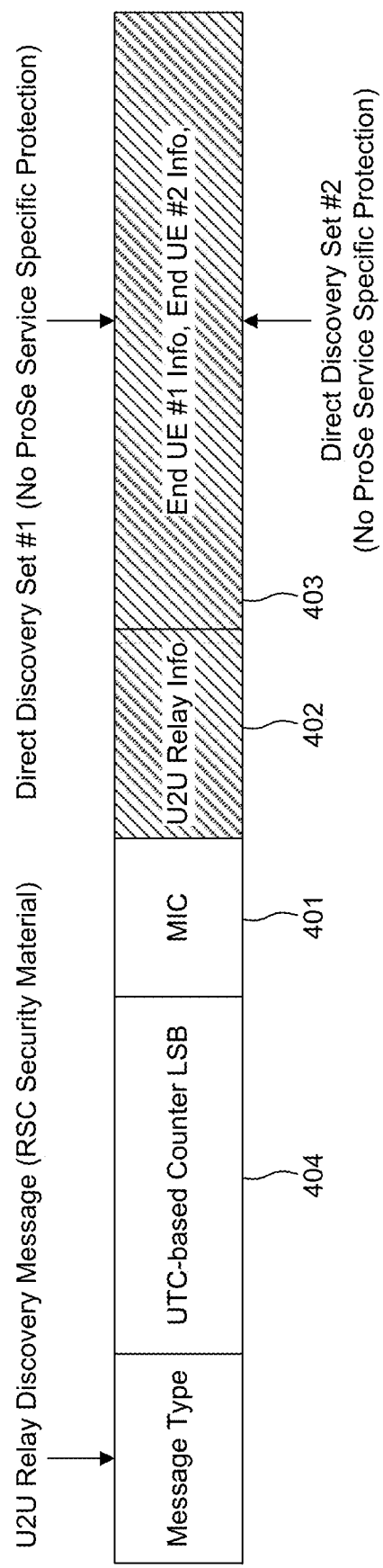
FIG. 4 shows an example of a relay message where a single key set associated with an RSC is used to protect the message.

FIG. 4 shows an example of a relay message where a single key set associated with an RSC is used to protect the message. The message integrity code (MIC) 401 may be computed for the integrity protection of the message using an integrity key. The part of the message with UE-to-UE relay info ID 402 and end-UEs information element 403 may be encrypted using a confidentiality key. (Here the term UE-to-UE relay info ID refers to the user info ID of the UE-to-UE relay.) The UTC-based counter may be used on both integrity and confidentiality computation to guarantee freshness of the protection and protect against replay attacks. The UTC-based counter used by UEs internally may be encoded, e.g., as the 32 most significant bits of UTC time. The parameter sent in the message by the Announcing UE may carry the four least significant bits (LSB) of the UTC-based counter 404; this may be used by the monitoring UE when setting the value of the UTC-based counter to ensure both UEs uses the same value.

In one example, a single key set may be used to protect the relay message. When a single key set is associated with an RSC, a UE authorized to use an RSC may decrypt, tamper with, or replay any DDS transmitted with that RSC. For example, a first UE authorized to use a first ProSe service may be able to eavesdrop the content of a relay message, including information of a second UE using a different ProSe service. Mitigation of this security issue may be possible by enforcing security isolation between Prose services (i.e., avoiding multiple ProSe services sharing common RSC keys). However, this may require the configuration of a dedicated RSC for a given ProSe service. This may be defined as part of the service deployment.

In another example, multiple key sets may be used to protect the relay message. For instance, each ProSe service has an associated ProSe restricted code and security material. In this case, each individual direct discovery set (DDS) may be protected using their own individual security material, e.g., the ProSe restricted code-associated security material. The RSC-associated security material may be used to encrypt the U2U relay discovery message.

Figure 5:
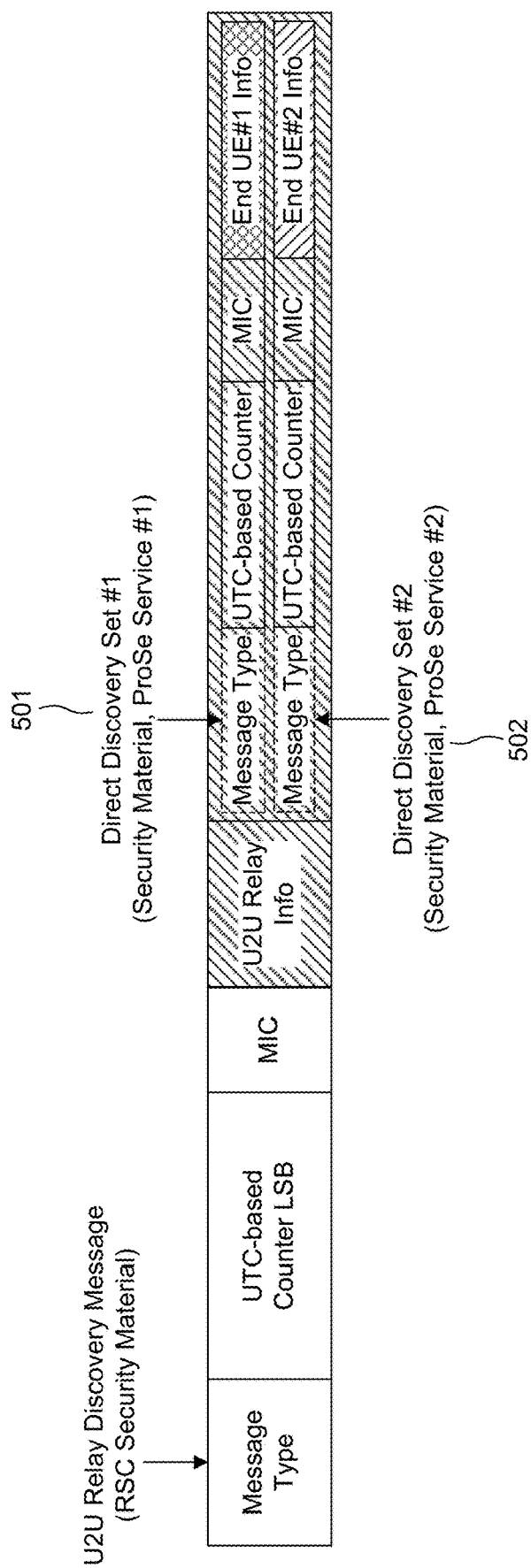
FIG. 5 shows an example of a relay message where multiple key sets associated with an RSC are used to protect the message.

FIG. 5 shows an example of a relay message where multiple key sets associated with an RSC are used to protect the message. In this example, each DDS (e.g., Set #1 501 and Set #2 502) may be protected using its specific key set associated with its respective ProSe restricted code.

The single key set approach may allow simpler deployment options and less impact to existing discovery/provisioning procedures. As such, it may be adequate when a dedicated RSC is used, or when no per ProSe service additional protection is necessary (e.g., used with public safety related ProSe services). A multiple key sets approach may provide added flexibility in terms of RSC/ProSe services deployment, configuration options and means to mitigate the above potential security/privacy risk. This approach may be adequate when an RSC is used by multiple commercial ProSe services. Coexistence of these approaches may be desirable to support different deployments scenario and varying security requirements.

When employing the multiple key set approach, even though the U2U relay may be relaying traffic associated with a given ProSe restricted code, the key set associated with that ProSe restricted code may not be provisioned in the U2U relay, e.g., if the U2U relay is not authorized to use the ProSe service associated with that ProSe restricted code.

The U2U relay supporting protected DDS may support the multiple key set approach. The support for protected DDS by the U2U relay may be configured in the information associated with the RSC, i.e., it may be on a per-RSC basis. This allows for coexistence of RSCs supporting a single key set with RSCs supporting multiple key sets (e.g., supporting protected DDS). The U2U relay may use the configuration information associated with the RSC to determine if protected DDS is supported for the RSC, and then use information from the end-UE to determine if the specific DDS of the end-UE to be announced requires the supported protection.

End-UEs may send a protected DDS to a U2U relay in a discovery message. The U2U relay supporting protected DDS may extract the protected DDS from the message received from the end-UE to include in the discovery announcement message that the U2U relay sends. As multiple end-UEs may send discovery messages with protected DDSs to the U2E relay, the relay may extract each protected DDS received and transparently append/add every extracted protected DDSs to the discovery announcement message that the U2U relay sends.

End-UEs that are already connected to the relay may not retransmit discovery messages with protected DDSs to the relay, as they may not be needed after the relay is discovered, and sending the messages multiple times may increase overhead and impact the UE's battery life. The U2U relay may store a received protected DDS to send in a later discovery announcement message. However, due to the UTC-time based replay protection, the protected DDS may become invalid after a period of time, after which it may be invalidated when received by a monitoring end-UE. The relay may not have access to freshly generated protected DDSs and may not be able to properly announce the presence of the end-UE when needed.

In one example, when the U2U relay connected to the end-UE decides to announce previously discovered or currently connected end-UEs, the U2U relay may request a protected DDS from these end-UEs. The U2U relay may determine that a ProSe service used by an end-UE is subject to DDS protection based on stored ProSe restricted code in the PC5 link context. If a protected DDS received from a previously discovered or currently connected UE is stored, the U2U relay may verify its validity. If the protected DDS is invalid (e.g., based on UTC-time), the U2U relay may send a request to obtain updated protected DDS from the previously discovered or currently connected UE.

The protected DDS request message may be a newly defined PC5 signaling (PC5-S) message, or an existing PC5-S message may be enhanced to include the DDS-related information. The U2U relay may send the PC5-S request message, including the ProSe restricted code, requesting the protected DDS from an end-UE. The U2U relay may receive, from the end-UE, a PC5-S response message including the protected DDS corresponding to the ProSe restricted code. The U2U relay may then send a U2U relay discovery announcement message including the received protected DDS.

In one example, an end-UE may send a protected DDS based on a configured U2U relay discovery time value. The end-UE may run a timer, and upon timer expiry, the end-UE may send a message to the U2U relay including an updated protected DDS.

In one example, when the U2U relay receives information from an end-UE including a protected DDS, the U2U relay may send, to the end-UE, a message including a time value for a next announcement opportunity. The end-UE may then send an updated protected DDS to the U2U relay during the next announcement opportunity.

In one example, the U2U relay may include discovery scheduling assistance information in the discovery announcement messages. The discovery scheduling assistance information may include information about the announcement opportunities. This may be, for example, the time offset (from the current time) until the next announcement. This may include, for example, a configuration for periodic announcement opportunities, including starting time, ending time, and the periodicity of such opportunities.

Each RSC may have more than one ProSe services (e.g., ProSe restricted codes) associated to it. The user info ID assigned to end-UEs is only unique on a per-ProSe service basis, i.e., the same user info ID may be assigned to different end-UEs using different services. The different services may be associated to the same RSC. Consequently, more than one IP address may be associated with the same user info ID. Since the relay saves the user info ID and IP address/prefix information in a table to be able to reply to DNS queries, when the relay receives a DNS query message, which includes a user info ID, it finds the user info ID in the table and sends back a DNS response message including the corresponding IP address/prefix information. In this case, there may be more than one entry in the table associated to the same user info ID. In order to be able to identify user info IDs received from different end-UEs and associated with different end-UEs when receiving a DNS Query message, the U2U relay may use the ProSe restricted code associated with the service in addition to the user info ID. In other words, each unique pair of ProSe restricted code and user info ID may have its own IP address/prefix information.

An end-UE connected to the U2U relay may probe (e.g., using DNS query) the relay for the IP address/prefix information of other end-UEs based on an end-UE user info ID it may possess. This may provide a malicious end-UE means to circumvent authorization for restricted discovery and ability to track whether a particular end-UE is connected to the U2U relay. To mitigate this risk, it is desired to ensure that the IP address/prefix information is only shared with authorized end-UEs. In other words, it is desired to ensure that the U2U relay shares IP address/prefix information of end-UE A with end-UE B only if end-UE B is authorized for restricted discovery with end-UE A using the same ProSe restricted code from the unique pair of ProSe restricted code and user info ID associated with the IP address/prefix information of interest.

In one example, during a link establishment procedure, a U2U relay may receive, from a first end-UE, a direct connection request (DCR) message including an RSC and a first ProSe restricted code. The U2U relay may store the ProSe restricted code in the context associated with the first end-UE (PC5 link, DNS entry). The U2U relay may send, to the first end-UE, a direct connection accept (DCA) message, acknowledging 'IP sharing protection' is enabled for the first end-UE. By having 'IP sharing protection' enabled, the U2U relay is ensuring that it will only share the first end-UE's IP address/prefix information with a second end-UE, if the second end-UE is authorized for restricted discovery with the first ProSe restricted code.

During DNS resolution procedure, the U2U relay may receive, from the second end-UE, a DNS Query message including the second end-UE user info ID and a second ProSe restricted code. The U2U relay may verify if the second ProSe restricted code matches the first ProSe restricted code. The U2U relay may send, to the second end-UE, a DNS Response message including first end-UE IP address/prefix information only if the second ProSe restricted code is the same as the first ProSe restricted code.

Figure 6:
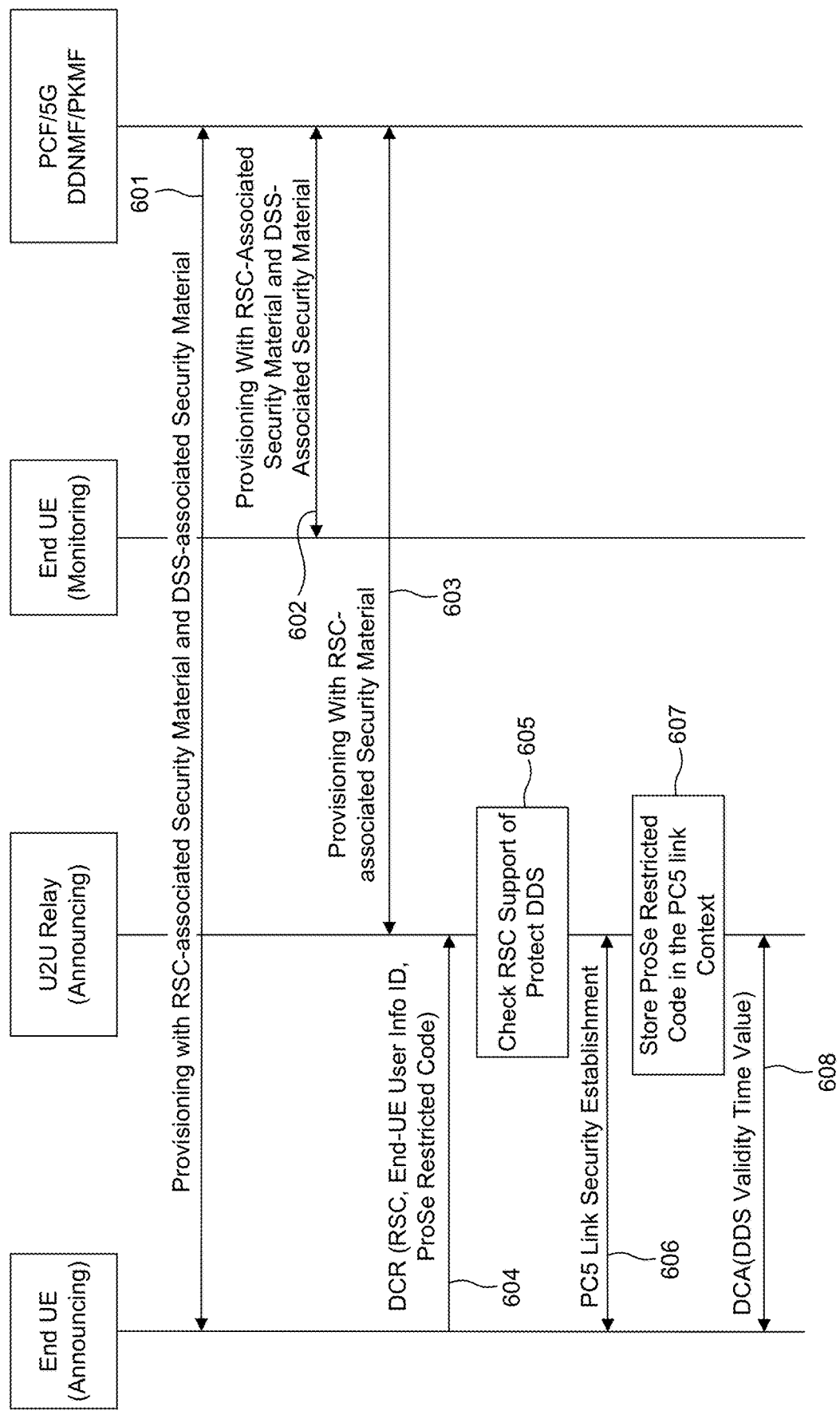
FIG. 6 shows an example call flow of a U2U relay direct link establishment procedure with support of Model A U2U relay discovery using multiple key sets and IP sharing privacy.

FIG. 6 shows an example call flow of a U2U relay direct link establishment procedure with support of Model A U2U relay discovery using multiple key sets and IP sharing privacy;

The end-UEs may be provisioned by a DDNMF or PCF or PKMF with an RSC-associated security material and a DDS-associated security material 601, 602. The DDS-security material may include a ProSe restricted code and associated key material. A U2U relay may be provisioned by a PCF or PKMF with an RSC-associated security material 603. The U2U relay and end-UEs may be configured with an indicator associated with the RSC, indicating whether the RSC supports protected DDS. The indicator may also indicate if the usage of protected DDS is mandatory for the RSC, e.g., whether the RSC may operate without the protected DDS.

The end-UE may send a direct connection request (DCR) message to the U2U relay, including an RSC, end-UE user info ID, and ProSe restricted code 604. The end-UE may provide an indication for DDS protection. The end-UE may provide a validity time value for the ProSe restricted code (e.g., based on corresponding validity time value configured by PCF/DDNMF in the end-UE). The ProSe restricted code may be used by the U2U relay to determine whether a particular end-UE is subject to IP sharing privacy protection and/or to enable disambiguation of end-UE user info ID (when multiple entries exist).

The parameters in the DCR message such as RSC, end-UE user info ID, and ProSe restricted code may be protected (e.g., for confidentiality, integrity and against replay) using the RSC-associated security material. An indication for support of protected DDS may be provided instead of a ProSe restricted code. The indication may be provided to avoid exposing a specific ProSe restricted code and/or unauthorized linkage of ProSe restricted code with end-UE user info ID (e.g. if identifiers parameters are not confidentiality protected in DCR message). The indication may be used by the U2U relay to determine that the end-UE may have at least one protected direct discovery set to be announced by the U2U relay.

Upon receiving the DCR message including the ProSe restricted code/indication for DDS protection, the U2U relay may verify that if the RSC supports protected DDS 605 based on the indicator described above.

The U2U relay and end-UE may establish the security for the PC5 link 606. The U2U relay may store the ProSe restricted code/indication for DDS protection along with the end-UE user info ID in the PC5 link context 607. The U2U relay may send to the end-UE a direct connection accept (DCA) message 608 including a time value for a next opportunity for the announcement by the U2U relay of protected DDS(s) from the end-UE.

Figure 7:
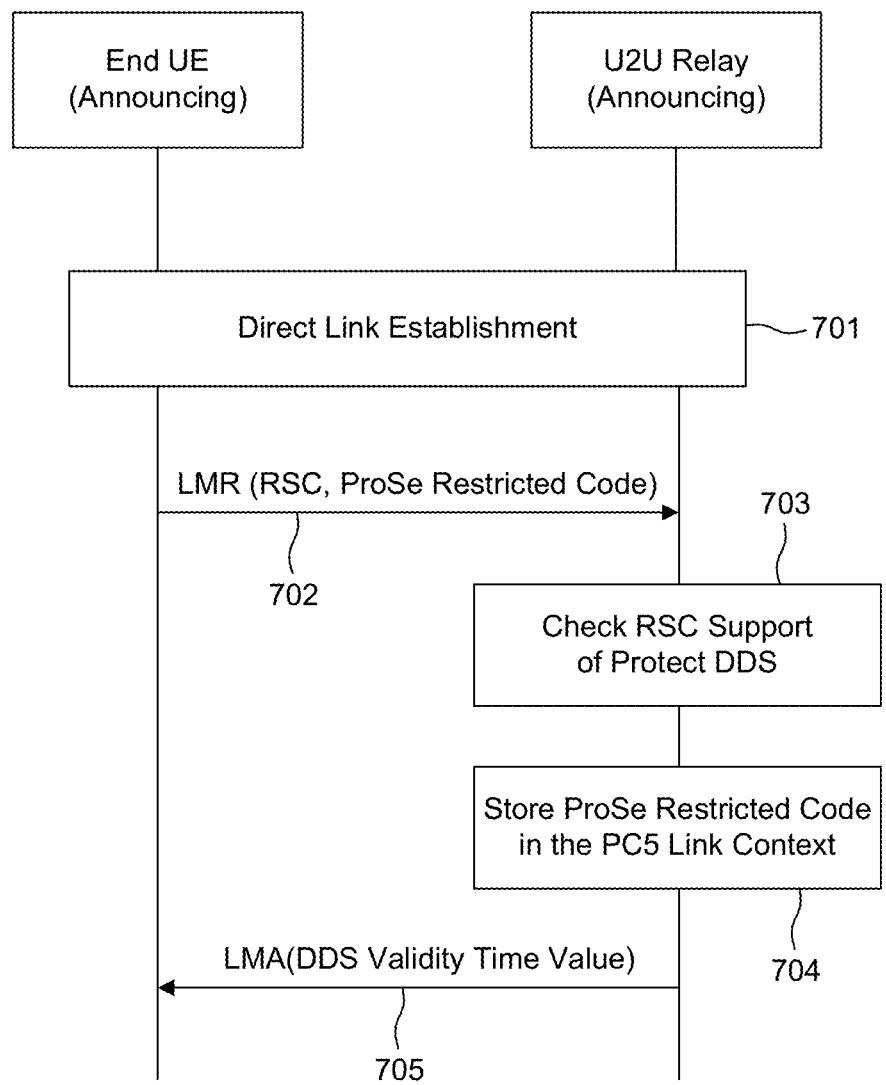
FIG. 7 shows an example call flow of a U2U relay direct link modification procedure to enable support of Model A U2U relay discovery using multiple key sets and IP sharing privacy.

FIG. 7 shows an example call flow of a U2U relay direct link modification procedure to enable support of Model A U2U relay discovery using multiple key sets and IP sharing privacy.

The end-UE may have a link established with the U2U relay 701. The end-UE may send a Link Modification Request (LMR) message to the U2U relay 702, including a ProSe restricted code (e.g., for adding another ProSe service reusing the existing link or to provide securely the ProSe restricted code in case it was not sent in DCR e.g., if an indication was provided during the link establishment instead of a ProSe restricted code). The end-UE may provide an indication for DDS protection and validity time value, as described above for the case of DCR. The provided ProSe restricted code may be used by the U2U relay to determine whether a particular end-UE is subject to IP sharing privacy protection and/or to enable disambiguation of end-UE user info ID (when multiple entries exist).

The LMR may be initiated by the end-UE to activate the DDS protection for the end-UE and/or for a particular ProSe service subject to DDS protection (e.g., existing ProSe services over the PC5 link is not subject to DDS protection and end-UE wants to activate it). The LMR may be initiated by the end-UE to revoke a ProSe restricted code following a discovery update procedure, where the DDNMF revokes a previously allocated ProSe restricted code. An indication for revocation of a ProSe restricted code may be included in this case. if a new code is allocated by DDNMF for the end-UE to replace the old code, the LMR may include an old and a new ProSe restricted code value, new validity time parameters.

Upon receiving the DCR message including the ProSe restricted code/indication for DDS protection, the U2U relay may verify, based on the associated indicator, that the RSC supports protected DDS 703.

The U2U relay may store the ProSe restricted code/indication for DDS protection along existing end-UE info in the PC5 link context 704. Alternatively, the U2U relay may remove or replace the ProSe restricted code if it is to be revoked or replaced (as indicated above). The U2U relay may decide to release the direct link if all of end-UE ProSe restricted code(s) are removed, with no other ProSe service left in use.

The U2U relay may send to the end-UE a Link Modification Accept (LMA) message including an announcing time value for a next opportunity for the announcement by the U2U relay of protected DDS(s) from end-UE (e.g., if the DDS protection has been activated for ProSe service(s) used on this link) 705. If the U2U relay revoked the last ProSe restricted code for the end-UE, the U2U relay may include an indication to cancel any pending protected DDS timer.

The U2U relay may also invalidate a stored ProSe restricted code when the corresponding validity timer expires. The U2U relay may decide to release the direct link with end-UE if all of end-UE ProSe restricted code(s) are expired, with no other ProSe service left in use.

Figure 8:
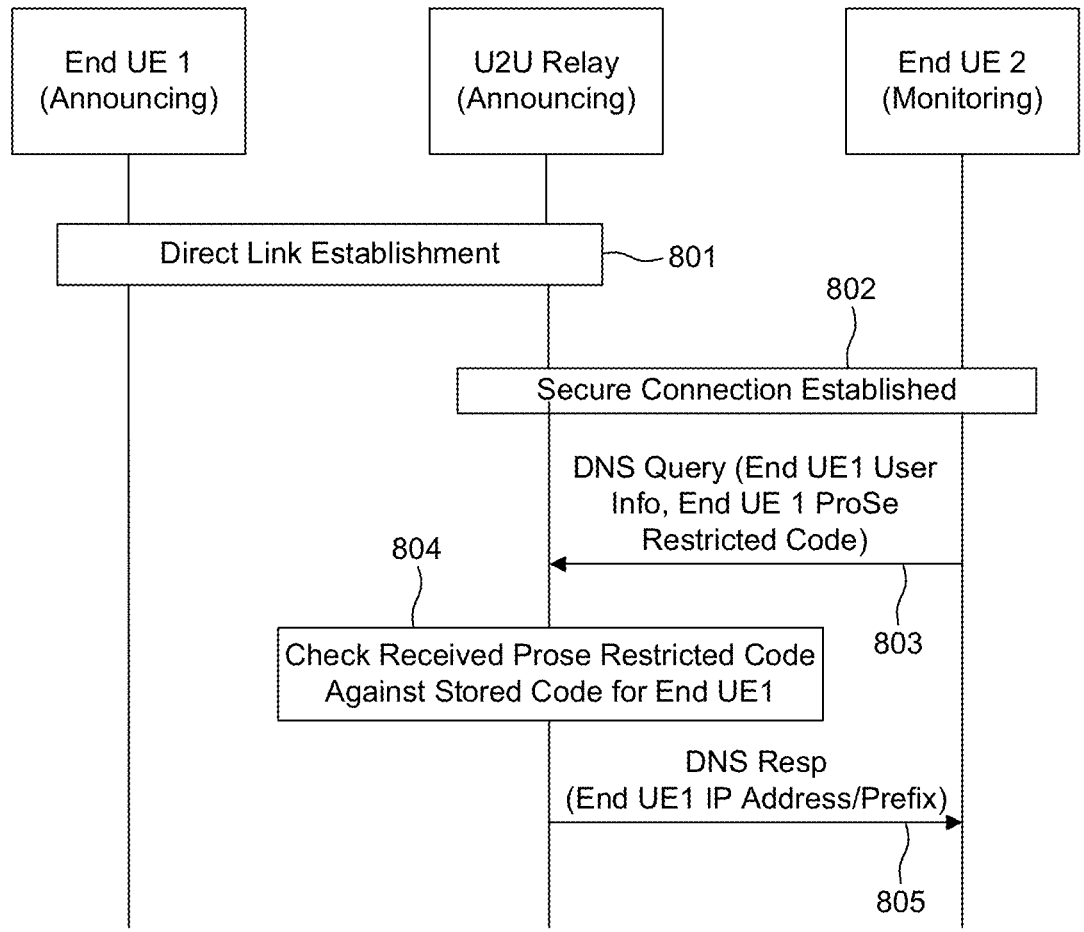
FIG. 8 shows an example call flow of a U2U relay DNS query with IP sharing privacy.

FIG. 8 shows an example call flow of a U2U relay DNS query with IP sharing privacy.

End-UE 1 may perform a direct link establishment procedure with the U2U relay 801. End-UE 2 may have established a secure connection with U2U relay 802 (e.g., using a direct link establishment procedure).

The U2U relay may receive from end-UE 2 a DNS Query including end-UE 1 user info ID and ProSe restricted code used to discover end-UE 1 803.

The U2U relay may verify that there is an entry for end-UE 1 user info ID and received ProSe restricted code 804. Multiple entries may exist for the same user info ID. The ProSe restricted code is used to select the specific entry (i.e., retrieve the unique pair of ProSe restricted code and user info ID). The U2U relay may verify that the validity timer for the ProSe restricted code is not expired. The U2U relay may send to end-UE 2 a DNS Response including IP address/prefix information of end-UE 1 805, if the previous check is successful.

Figure 9:
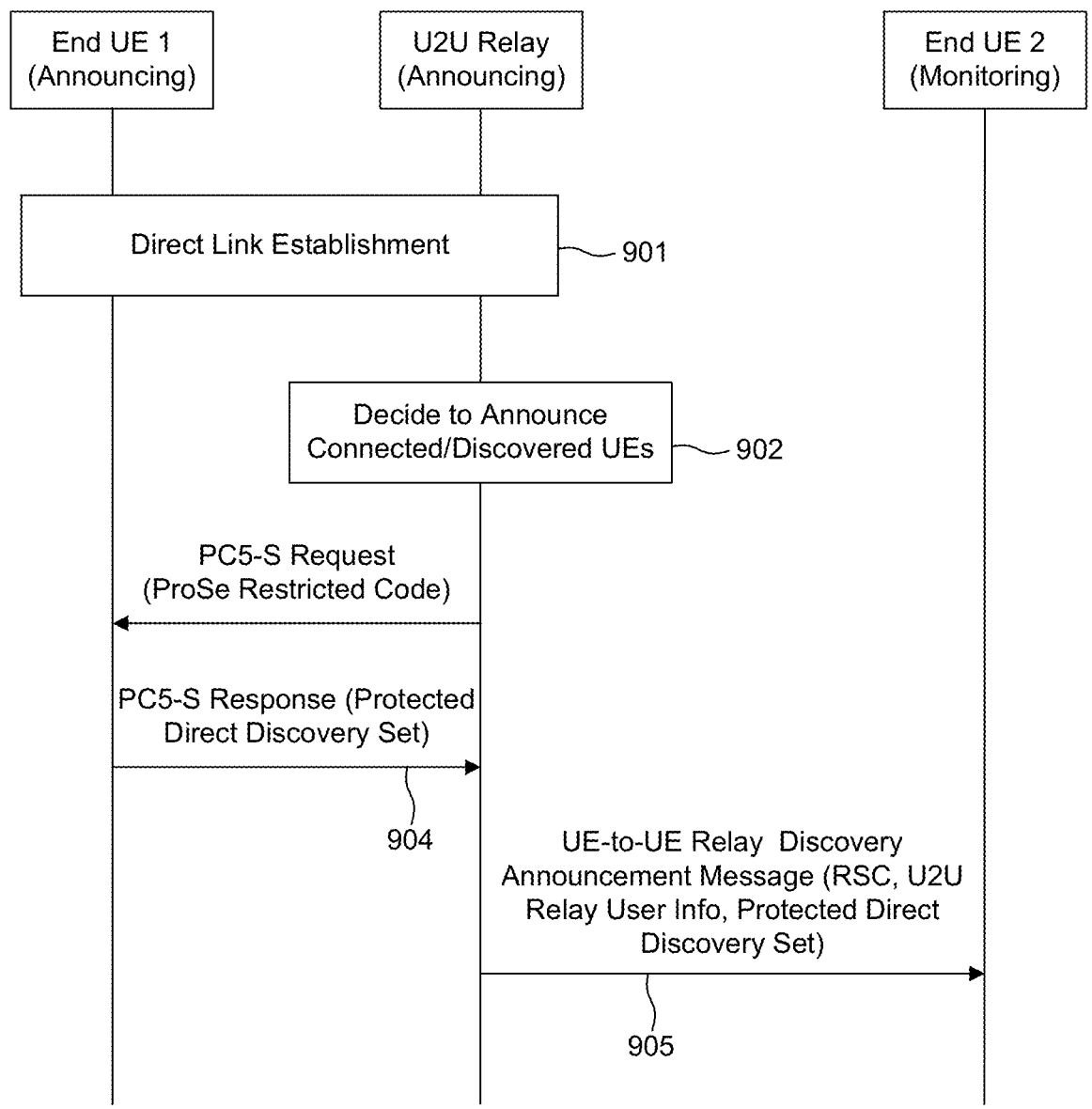
FIG. 9 shows an example call flow of U2U relay-initiated Model A U2U relay discovery procedure using multiple key sets.

FIG. 9 shows an example call flow of U2U relay-initiated Model A U2U relay discovery procedure using multiple key sets.

End-UE 1 may perform a direct link establishment procedure with the U2U relay 901. The U2U relay may decide to announce connected or discovered UEs 902.

For each of the stored Prose restricted codes for end-UE 1, the U2U relay may send a PC5 signaling message (PC5-S) request message, including the Prose restricted code previously received from end-UE 1, to request a corresponding protected DDS 903. A new PC5-S signaling message may be defined or an existing PC5 message may be enhanced to include the new information needed, such as the keep alive message may be reused for the request for a protected DDS associated with a ProSe restricted code.

In one example, the U2U relay may send a PC5-S request message including an indication to request all applicable protected DDSs for all services (e.g., end-UE 1 is using several different ProSe services subject to per ProSe service protection). In another example, the U2U relay may send a list of Prose restricted codes.

End-UE 1 may generate a secure PC5-S response message (e.g., keep alive message) including RSC and a DDS protected using direct discovery security material 904. End-UE 1 may include one or more DDSs in the response message (e.g., if the request included a list of Prose restricted codes). The end-UE 1 may protect the PC5-S message using the PC5 link security context and send it to the U2U relay.

The U2U relay may process the PC5-S response message security and extract the protected DDS(s). The U2U relay may verify that the ProSe restricted code from the received protected DDS is valid (e.g., based on the validity time value, verify if the validity timer is not expired). The U2U relay may send a U2U relay protected discovery message including RSC, U2U relay user info ID, and the protected DDS(s) received from end-UE 1 to end-UE 2 905. The U2U relay may protect the U2U relay discovery message using the security material associate with the RSC.

Figure 10:
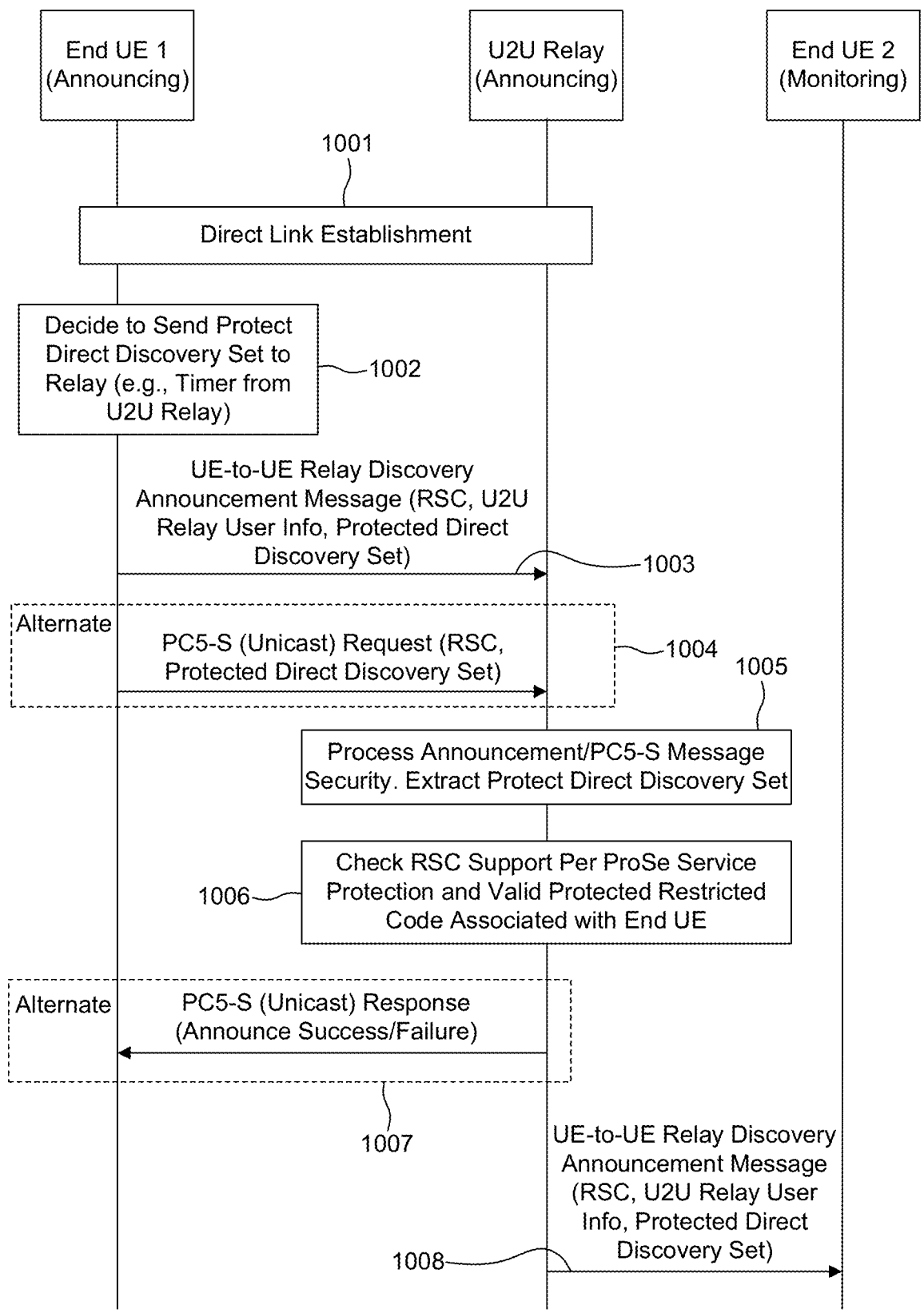
FIG. 10 shows an example call flow of an end-UE initiated Model A U2U relay discovery procedure using multiple key sets.

FIG. 10 shows an example call flow of an end-UE initiated Model A U2U relay discovery Model A procedure using multiple key sets.

End-UE 1 may perform a direct link establishment procedure with the U2U relay 1001. End-UE 1 may decide to provide the U2U relay with one or more protected DDSs 1002. This may be triggered based on the announcing time value provided by the U2U relay as described above (e.g., in DCA or LMA).

End-UE 1 may generate a U2U relay discovery announcement message including RSC, U2U relay user info ID, and one or more DDSs, each protected using their respective DDS-associated security material 1003. The end-UE 1 may protect the U2U relay discovery message using the RSC-associated security material and send it to U2U relay. The destination L2 ID may be set to the U2U relay L2 ID discovered by end-UE 1, or using a conventional configured default L2 ID.

Alternatively 1004, end-UE 1 may generate a secure PC5-S(unicast) request message (e.g., keep alive request message, or a new PC5-S message may be defined) including RSC and one or more DDS(s), each protected using their respective DDS-associated security material. The end-UE 1 may protect the PC5-S message using the PC5 link security context and send it to U2U relay.

The U2U relay may process the U2U relay discovery/PC5-S request message security and extract the included protected DDS 1005.

The U2U relay may verify that the RSC supports protected DDS and the validity of ProSe restricted code(s) from the received protected DDS(s) 1006. The U2U relay may verify that each received code matches a stored ProSe restricted code for end-UE 1 and that it is not expired (e.g., based on validity time value as described above).

For the alternate case of PC5 S message 1004, the U2U relay may send to end-UE 1 a secure PC5-S response message (e.g., keep alive response message, or a new PC5-S may be defined) including a response status for the announcement (e.g., success or failure) 1007. The response may include the relevant ProSe restricted code(s).

The U2U relay may send a U2U relay protected discovery message including RSC, U2U relay user info ID, and the protected DDS(s) received from end-UE 1 to end-UE 2

1008. The U2U relay may protect the U2U relay discovery message using the security material associate with the RSC.

Figure 11:
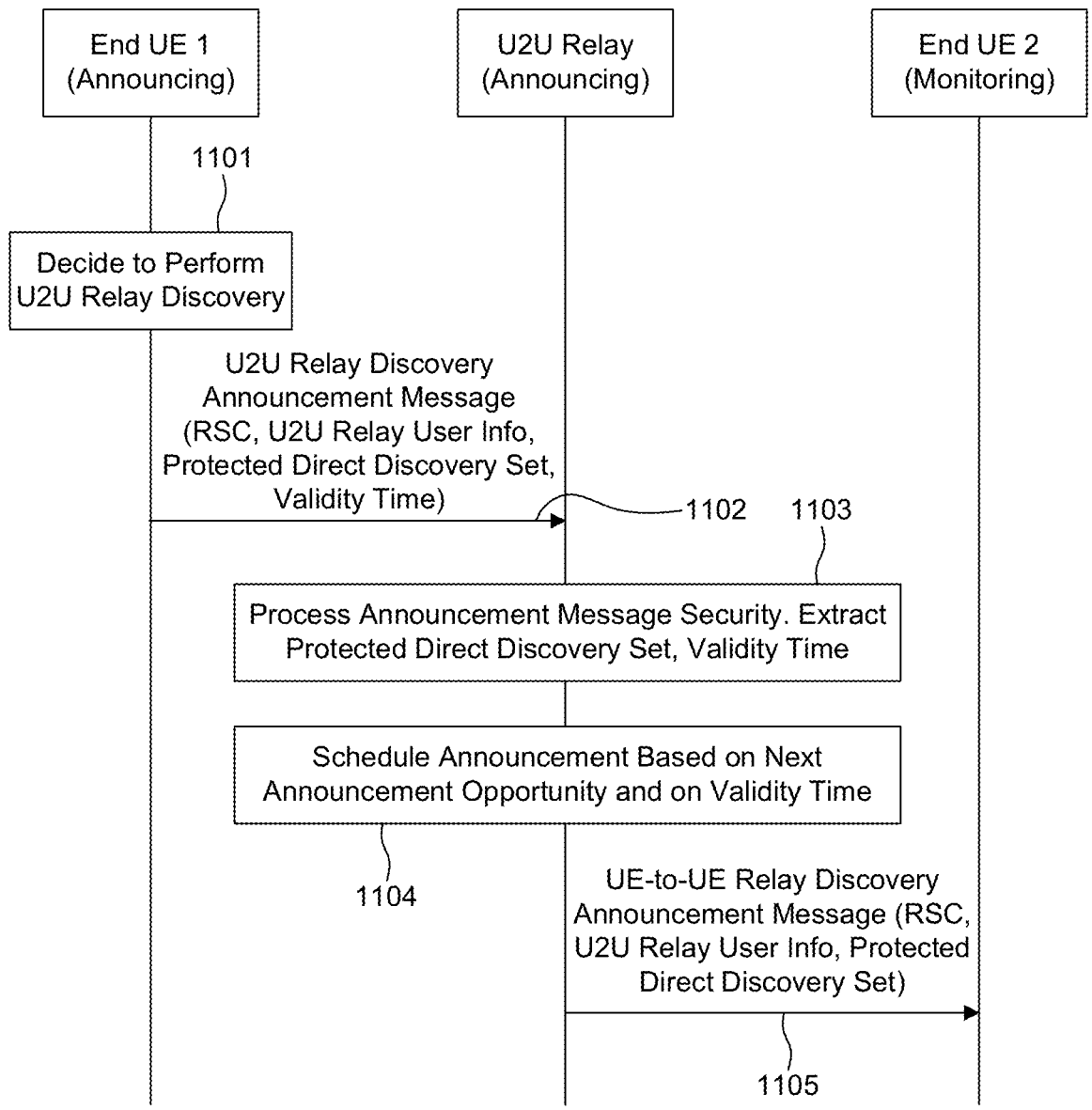
FIG. 11 shows an example call flow of a U2U relay-initiated Model A U2U relay discovery procedure with deferred announcement of discovered end-UE.

FIG. 11 shows an example call flow of a U2U relay-initiated Model A U2U relay discovery procedure with deferred announcement of discovered end-UE.

End-UE 1 may decide to send a discovery announcement message to the U2U relay 1101. The end-UE may monitor prior discovery announcement messages sent by the U2U relay to determine the U2U relay next scheduled announcement opportunity. For example, the U2U relay may include in the discovery announcement messages discovery scheduling assistance information to inform the end-UE(s) in proximity about the next announcement opportunity by the U2U relay (e.g., expressed as a time offset/window relative to current time or discovery message transmission time). The end-UE may use this information to schedule/synchronize the transmission of its own discovery messages towards the relay in a timely manner such as to allow the relay to include protected DDS from the end-UE in its next relay announcement message (e.g., close to real time, before the U2U relay next transmission).

End-UE 1 may generate a U2U relay discovery announcement message including RSC, U2U relay user info ID, and a DDS protected using direct discovery security material and a validity time value 1102. The validity time value may be set such as to not exceed a maximum range tolerated by the time based replay protection. For example, the validity time value may be set such as not the exceed the maximum time held by the UTC-based counter LSB (e.g., 2, 4 or 16 seconds).

The U2U relay may process the U2U relay discovery/PC5-S request message and extract the protected DDS and validity time value 1103. The U2U relay may verify that the RSC supports protected DDS.

The U2U relay may schedule the next announcement for end-UE protected DDS according to its own next scheduled announcement opportunity (e.g., based on implementation) and may consider the received validity time value 1104. For example, if the time difference between next scheduled announcement opportunity is greater than the validity time value (or if no validity time value is provided) the U2U relay may decide to send a protected DDS of end-UE1 immediately (or discard the current end-UE 1 discovery message until a more suitable/aligned relay announcing opportunity).

The U2U relay may send a U2U relay protected discovery message including RSC, U2U relay user info ID, and the protected DDS received from end-UE 11105 at the scheduled time. The U2U relay may protect the U2U relay discovery message using the security material associated with the RSC.

In one example, a U2U relay may be configured with an RSC-associated security material and end-UEs may be configured with an RSC-associated security material and a DDS-associated security material. The DDS-associated security material may be associated with a ProSe restricted code. The U2U relay and the end-UEs may be configured with an indicator associated with the RSC, indicating whether the RSC supports protected DDS.

In one example, a U2U relay may send, to a connected end-UE, a request message for a protected DDS. The request message may include a ProSe restricted code. The U2U relay may receive, from the connected end-UE, a response message. The response message may include the protected DDS requested. The message may also include a message type, the ProSe restricted code associated with the DDS, a UTC-based counter, a MIC, and protected end-UE info ID. In another example, an end-UE may send a U2U relay discovery message including a protected DDS. The U2U relay may send a discovery announcement including the received protected DDS.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU) operating as a user equipment (UE)-to-UE relay, the method comprising:
    receiving, from a first end-UE, a first message, the first message comprising a first protected direct discovery set (DDS), wherein the first protected DDS includes at least a first user information identification (user info ID) of the first end-UE and the first protected DDS is protected using first security material that is associated with a first Proximity Service (ProSe) service;
    receiving, from a second end-UE, a second message, the second message comprising a second protected DDS, wherein the second protected DDS includes at least a second user info ID of the second end-UE and the second protected DDS is protected using second security material that is associated with a second ProSe service; and
    broadcasting a third message, wherein:
        the third message comprises the first protected DDS, the second protected DDS, and a relay service code (RSC) associated with a relay connectivity service provided by the WTRU, and
        the third message is protected using third security material that is associated with the RSC.

2. The method of claim 1, wherein the first end-UE is provisioned with the first security material and the second end-UE is provisioned with the second security material.

3. The method of claim 1, wherein the WTRU, the first end-UE, and the second end-UE are provisioned with the third security material.

4. The method of claim 1, further comprising verifying, at the WTRU, based on a configured indication, that the relay connectivity service provided by the WTRU supports relay operation with protected DDS.

5. The method of claim 4, wherein the configured indication is configured by a network and using RRC signaling.

6. The method of claim 4, wherein the configured indication is pre-provisioned in the WTRU.

7. The method of claim 1, further comprising, sending, to a fourth end-UE, a fourth message, wherein the fourth message is a PC5 signaling (PC5-S) request message, the fourth message includes a request for a protected DDS, and the fourth message is sent during an announcement period configured in the WTRU.

8. The method of claim 7, further comprising, receiving, from the fourth end-UE, based on the PC5-S request message, a fifth message, wherein the fifth message includes the requested protected DDS.

9. A wireless transmit/receive unit (WTRU) configured to implement a UE-to-UE relay functionality, the WTRU comprising at least one processor and a transceiver, wherein the least one processor and transceiver are configured to:

the least one processor and transceiver are configured to receive, from a first end-UE, a first message, the first message comprising a first protected direct discovery set (DDS), wherein the first protected DDS includes at least a first user information identification (user info ID) of the first end-UE and the first protected DDS is protected using first security material that is associated with a first Proximity Service (ProSe) service;

the least one processor and transceiver are configured to receive, from a second end-UE, a second message, the second message comprising a second protected DDS, wherein the second protected DDS includes at least a second user info ID of the second end-UE and the second protected DDS is protected using second security material that is associated with a second ProSe service; and broadcast a third message, wherein:
the third message comprises the first protected DDS, the second protected DDS, and a relay service code (RSC) associated with a relay connectivity service provided by the WTRU, and the third message is protected using third security material that is associated with the RSC.

10. The WTRU of claim 9, wherein the first end-UE is provisioned with the first security material and the second end-UE is provisioned with the second security material.

11. The WTRU of claim 9, wherein the WTRU, the first end-UE, and the second end-UE are provisioned with the third security material.

12. The WTRU of claim 9, wherein the least one processor and transceiver are further configured to verify, based on a configured indication, that the relay connectivity service provided by the WTRU supports relay operation with protected DDS.

13. The WTRU of claim 12, wherein the configured indication is configured by a network and using RRC signaling.

14. The WTRU claim 12, wherein the configured indication is pre-provisioned in the WTRU.

15. The WTRU of claim 9, wherein the least one processor and transceiver are further configured to send, to a fourth end-UE, a fourth message, wherein the fourth message is a PC5 signaling (PC5-S) request message, the fourth message includes a request for a protected DDS, and the fourth message is sent during an announcement period configured in the WTRU.

16. The WTRU of claim 15, wherein the least one processor and transceiver are further configured to receive, from the fourth end-UE, based on the PC5 request message, a fifth message, wherein the fifth message includes the requested protected DDS.

* * * * *